(12) United States Patent
Kolavennu

(10) Patent No.: US 7,357,125 B2
(45) Date of Patent: Apr. 15, 2008

(54) EXHAUST GAS RECIRCULATION SYSTEM

(75) Inventor: Soumitri N. Kolavennu, Minneapolis, MN (US)

(73) Assignee: Honeywell International Inc., Morristown, NJ (US)

(*) Notice: Subject to any disclaimer, the term of this patent is extended or adjusted under 35 U.S.C. 154(b) by 49 days.

(21) Appl. No.: 11/163,666

(22) Filed: Oct. 26, 2005

(65) Prior Publication Data

US 2007/0089715 A1    Apr. 26, 2007

(51) Int. Cl.
  F02M 25/07    (2006.01)
  F02B 47/08    (2006.01)
(52) U.S. Cl. .............................. 123/568.11; 123/568.21
(58) Field of Classification Search ............... 123/58.8, 123/568.11–568.14, 568.17, 568.18, 568.2, 123/568.21; 60/278, 279, 320, 321, 605.2; 701/108
See application file for complete search history.

(56) References Cited

U.S. PATENT DOCUMENTS

| | | | |
|---|---|---|---|
| 1,833,802 A * | 11/1931 | Violet | .................... 123/568.11 |
| 3,744,461 A | 7/1973 | Davis | |
| 4,005,578 A | 2/1977 | McInerney | |
| 4,055,158 A | 10/1977 | Marsee | |
| 4,252,098 A | 2/1981 | Tomczak et al. | |
| 4,345,572 A * | 8/1982 | Suzuki et al. | ........... 123/568.11 |
| 4,383,441 A | 5/1983 | Willis et al. | |
| 4,426,982 A | 1/1984 | Lehner et al. | |
| 4,438,497 A | 3/1984 | Willis et al. | |
| 4,456,883 A | 6/1984 | Bullis et al. | |
| 4,485,794 A | 12/1984 | Kimberley et al. | |
| 4,506,633 A * | 3/1985 | Britsch | ....................... 123/58.8 |
| 4,601,270 A | 7/1986 | Kimberley et al. | |
| 4,653,449 A | 3/1987 | Kamei et al. | |
| 4,917,054 A * | 4/1990 | Schmitz | ...................... 123/58.8 |
| 5,044,337 A | 9/1991 | Williams | |
| 5,076,237 A | 12/1991 | Hartman et al. | |
| 5,089,236 A | 2/1992 | Clerc | |
| 5,108,716 A | 4/1992 | Nishizawa | |
| 5,123,397 A | 6/1992 | Richeson | |

(Continued)

FOREIGN PATENT DOCUMENTS

DE    19528680    2/1997

(Continued)

OTHER PUBLICATIONS

"SCR, 400-csi Coated Catalyst," Leading NOx Control Technologies Status Summary, 1 page prior to the filing date of the present application.

(Continued)

Primary Examiner—Willis R. Wolfe, Jr.
(74) Attorney, Agent, or Firm—Kris T. Fredrick

(57) ABSTRACT

A flow control mechanism connected to the intake and exhaust systems of an engine. The mechanism may achieve recirculation of exhaust gases despite varying differential pressures or pulses of pressures. The control mechanism may be connected to a storage device. The pulses may be used to store some of the exhaust gas in the storage device. The exhaust gas needed at the intake manifold may be supplied while the exhaust gas is replenished. The storage may eliminate the necessity of dealing with the pressure pulses and dependent coordination of the flow control mechanism with the pulses.

17 Claims, 2 Drawing Sheets

U.S. PATENT DOCUMENTS

| | | | |
|---|---|---|---|
| 5,233,829 A | 8/1993 | Komatsu | |
| 5,282,449 A | 2/1994 | Takahashi et al. | |
| 5,349,816 A | 9/1994 | Sanbayashi et al. | |
| 5,365,734 A | 11/1994 | Takeshima | |
| 5,398,502 A | 3/1995 | Watanabe | |
| 5,452,576 A | 9/1995 | Hamburg et al. | |
| 5,477,840 A | 12/1995 | Neumann | |
| 5,494,020 A * | 2/1996 | Meng | 123/568.11 |
| 5,560,208 A | 10/1996 | Halimi et al. | |
| 5,570,574 A | 11/1996 | Yamashita et al. | |
| 5,598,825 A | 2/1997 | Neumann | |
| 5,609,139 A | 3/1997 | Ueda et al. | |
| 5,611,198 A | 3/1997 | Lane et al. | |
| 5,690,086 A | 11/1997 | Kawano et al. | |
| 5,692,478 A | 12/1997 | Nogi et al. | |
| 5,746,183 A | 5/1998 | Parke et al. | |
| 5,765,533 A | 6/1998 | Nakajima | |
| 5,771,867 A | 6/1998 | Amstutz et al. | |
| 5,785,030 A | 7/1998 | Paas | |
| 5,788,004 A | 8/1998 | Friedmann et al. | |
| 5,846,157 A | 12/1998 | Reinke et al. | |
| 5,893,092 A | 4/1999 | Driscoll | |
| 5,942,195 A | 8/1999 | Lecea et al. | |
| 5,964,199 A | 10/1999 | Atago et al. | |
| 5,974,788 A | 11/1999 | Hepburn et al. | |
| 6,029,626 A | 2/2000 | Bruestle | |
| 6,035,640 A | 3/2000 | Kolmanovsky et al. | |
| 6,048,620 A | 4/2000 | Zhong | |
| 6,055,810 A | 5/2000 | Borland et al. | |
| 6,058,700 A | 5/2000 | Yamashita et al. | |
| 6,067,800 A | 5/2000 | Kolmanovsky et al. | |
| 6,076,353 A | 6/2000 | Freudenberg et al. | |
| 6,105,365 A | 8/2000 | Deeba et al. | |
| 6,153,159 A | 11/2000 | Engeler et al. | |
| 6,161,528 A | 12/2000 | Akao et al. | |
| 6,170,259 B1 | 1/2001 | Boegner et al. | |
| 6,171,556 B1 | 1/2001 | Burk et al. | |
| 6,178,743 B1 | 1/2001 | Hirota et al. | |
| 6,178,749 B1 | 1/2001 | Kolmanovsky et al. | |
| 6,216,083 B1 | 4/2001 | Ulyanov et al. | |
| 6,237,330 B1 | 5/2001 | Takahashi et al. | |
| 6,242,873 B1 | 6/2001 | Drozdz et al. | |
| 6,263,672 B1 | 7/2001 | Roby et al. | |
| 6,273,060 B1 | 8/2001 | Cullen | |
| 6,279,551 B1 | 8/2001 | Iwano et al. | |
| 6,295,815 B1 * | 10/2001 | Bechle et al. | 60/605.2 |
| 6,312,538 B1 | 11/2001 | Latypov et al. | |
| 6,321,538 B2 | 11/2001 | Hasler | |
| 6,328,003 B1 * | 12/2001 | Gaertner et al. | 123/58.8 |
| 6,338,245 B1 | 1/2002 | Shimoda et al. | |
| 6,347,619 B1 | 2/2002 | Whiting et al. | |
| 6,360,159 B1 | 3/2002 | Miller et al. | |
| 6,360,541 B2 | 3/2002 | Waszkiewicz et al. | |
| 6,360,732 B1 | 3/2002 | Bailey et al. | |
| 6,379,281 B1 | 4/2002 | Collins et al. | |
| 6,425,371 B2 | 7/2002 | Majima | |
| 6,427,436 B1 | 8/2002 | Allansson et al. | |
| 6,431,160 B1 | 8/2002 | Sugiyama et al. | |
| 6,463,733 B1 | 10/2002 | Asik et al. | |
| 6,463,734 B1 | 10/2002 | Tamura et al. | |
| 6,470,682 B2 | 10/2002 | Gray, Jr. | |
| 6,470,886 B1 | 10/2002 | Jestrabek-Hart | |
| 6,502,391 B1 | 1/2003 | Hirota et al. | |
| 6,512,974 B2 | 1/2003 | Houston et al. | |
| 6,546,329 B2 | 4/2003 | Bellinger | |
| 6,560,528 B1 | 5/2003 | Gitlin et al. | |
| 6,571,191 B1 | 5/2003 | York et al. | |
| 6,579,206 B2 | 6/2003 | Liu et al. | |
| 6,612,293 B2 | 9/2003 | Schweinzer et al. | |
| 6,625,978 B1 | 9/2003 | Eriksson et al. | |
| 6,629,408 B1 | 10/2003 | Murakami et al. | |
| 6,647,710 B2 | 11/2003 | Nishiyama et al. | |
| 6,647,971 B2 | 11/2003 | Vaughan et al. | |
| 6,671,603 B2 | 12/2003 | Cari et al. | |
| 6,672,060 B1 | 1/2004 | Buckland et al. | |
| 6,679,050 B1 | 1/2004 | Takahashi et al. | |
| 6,687,597 B2 | 2/2004 | Sulatisky et al. | |
| 6,705,084 B2 | 3/2004 | Allen et al. | |
| 6,742,330 B2 | 6/2004 | Genderen | |
| 6,758,037 B2 | 7/2004 | Terada et al. | |
| 6,789,533 B1 | 9/2004 | Hashimoto et al. | |
| 6,823,667 B2 | 11/2004 | Braun et al. | |
| 6,823,675 B2 | 11/2004 | Brunell et al. | |
| 6,826,903 B2 | 12/2004 | Yahata et al. | |
| 6,827,061 B2 | 12/2004 | Nytomt et al. | |
| 6,976,480 B2 * | 12/2005 | Miyoshi et al. | 123/568.12 |
| 2001/0002591 A1 | 6/2001 | Majima | |
| 2002/0029564 A1 | 3/2002 | Roth et al. | |
| 2002/0056434 A1 | 5/2002 | Flamig-Vetter et al. | |
| 2002/0073696 A1 | 6/2002 | Kuenstler et al. | |
| 2002/0098975 A1 | 7/2002 | Kimura et al. | |
| 2002/0170550 A1 | 11/2002 | Mitsutani | |
| 2002/0173919 A1 | 11/2002 | Moteki et al. | |
| 2002/0184879 A1 | 12/2002 | Lewis | |
| 2002/0194835 A1 | 12/2002 | Bromberg et al. | |
| 2003/0022752 A1 | 1/2003 | Liu et al. | |
| 2003/0041590 A1 | 3/2003 | Kitajima et al. | |
| 2003/0089101 A1 | 5/2003 | Tanaka et al. | |
| 2003/0101713 A1 | 6/2003 | Dalla Betta et al. | |
| 2003/0120410 A1 | 6/2003 | Cari et al. | |
| 2003/0143957 A1 | 7/2003 | Lyon | |
| 2003/0145837 A1 | 8/2003 | Esteghlal et al. | |
| 2003/0150422 A1 | 8/2003 | Huh | |
| 2003/0172907 A1 | 9/2003 | Nytomt et al. | |
| 2003/0200016 A1 | 10/2003 | Spillane et al. | |
| 2003/0213465 A1 | 11/2003 | Fehl et al. | |
| 2003/0221679 A1 | 12/2003 | Surnilla | |
| 2003/0225507 A1 | 12/2003 | Tamura | |
| 2004/0006973 A1 | 1/2004 | Makki et al. | |
| 2004/0007211 A1 | 1/2004 | Kobayashi | |
| 2004/0007217 A1 | 1/2004 | Poola et al. | |
| 2004/0025837 A1 | 2/2004 | Hunt et al. | |
| 2004/0034460 A1 | 2/2004 | Folkerts et al. | |
| 2004/0040283 A1 | 3/2004 | Yasui et al. | |
| 2004/0040287 A1 | 3/2004 | Beutel et al. | |
| 2004/0050037 A1 | 3/2004 | Betta et al. | |
| 2004/0055278 A1 | 3/2004 | Miyoshi et al. | |
| 2004/0060284 A1 | 4/2004 | Roberts, Jr. et al. | |
| 2004/0065309 A1 * | 4/2004 | Verschoor | 123/568.11 |
| 2004/0074226 A1 | 4/2004 | Tanaka | |
| 2004/0089279 A1 | 5/2004 | McLaughlin et al. | |
| 2004/0112335 A1 | 6/2004 | Makino et al. | |
| 2004/0118117 A1 | 6/2004 | Hartman et al. | |
| 2004/0128058 A1 | 7/2004 | Andres et al. | |
| 2004/0129259 A1 | 7/2004 | Mitsutani | |
| 2004/0134464 A1 | 7/2004 | Mogi | |
| 2004/0135584 A1 | 7/2004 | Nagy et al. | |
| 2004/0139735 A1 | 7/2004 | Zhu | |
| 2004/0139951 A1 | 7/2004 | Fisher et al. | |
| 2004/0249558 A1 | 12/2004 | Meaney | |
| 2006/0137665 A1 * | 6/2006 | Khair et al. | 123/568.12 |

FOREIGN PATENT DOCUMENTS

| | | | |
|---|---|---|---|
| DE | 19717846 | 11/1998 | |
| DE | 10219382 | 11/2002 | |
| EP | 0980966 | 2/2000 | |
| EP | 1221544 | 7/2002 | |
| EP | 1369558 | 10/2003 | |
| JP | 59190443 | 10/1984 | |
| JP | 08232771 A * | 9/1996 | 123/568.11 |
| WO | WO 9960260 A1 * | 11/1999 | |
| WO | WO 02/101208 | 12/2002 | |
| WO | 03065135 | 8/2003 | |

WO WO 2004/027230 4/2004

OTHER PUBLICATIONS

Advanced Petroleum-Based Fuels-Diesel Emissions Control (APBF-DEC) Project, "Quarterly Update," No. 7, 6 pages, Fall 2002.
Allanson, et al., "Optimizing the Low Temperature Performance and Regeneration Efficiency of the Continously Regenerating Diesel Particulate Filter System," SAE Paper No. 2002-01-0428, 8 pages, Mar. 2002.
Amstuz, et al., "EGO Sensor Based Robust Output Control of EGR in Diesel Engines," IEEE TCST, vol. 3, No. 1, 12 pages, Mar. 1995.
Bemporad, et al., "Explicit Model Predictive Control," 1 page, prior to filing date of present application.
Borrelli, "Constrained Optimal Control of Linear and Hybrid Systems," Lecture Notes in Control and Information Sciences, vol. 290, 2003.
Catalytica Energy Systems, "Innovative NOx Reduction Solutions for Diesel Engines," 13 pages, 3$^{rd}$ Quarter, 2003.
Chatterjee, et al. "Catalytic Emission Control for Heavy Duty Diesel Engines," JM, 46 pages, prior to filing date of present application.
Delphi, Delphi Diesel NOx Trap (DNT), 3 pages, Feb. 2004.
GM "Advanced Diesel Technology and Emissions," powertrain technologies—engines, 2 pages, prior to filing date of present application.
Guzzella, et al., "Control of Diesel Engines," IEEE Control Systems Magazine, pp. 53-71, Oct. 1998.
Havelena, "Componentized Architecture for Advanced Process Management," Honeywell International, 42 pages, 2004.
Hiranuma, et al., "Development of DPF System for Commercial Vehicle—Basic Characteristic and Active Regeneration Performance," SAE Paper No. 2003-01-3182, Mar. 2003.
Honeywell, "Profit Optimizer A Distributed Quadratic Program (DQP) Concepts Reference," 48 pages, prior to filing date of present application.
http://www.not2fast.wryday.com/turbo/glossary/turbo_glossary.shtml, "Not2Fast: Turbo Glossary," 22 pages, printed Oct. 1, 2004.
http://www.tai-cwv.com/sb1106.0.html, "Technical Overview—Advanced Control Solutions," 6 pages, printed Sep. 9, 2004.
Kelly, et al., "Reducing Soot Emissions from Diesel Engines Using One Atmosphere Uniform Glow Discharge Plasma," SAE Paper No. 2003-01-1183, Mar. 2003.
Kolmanovsky, et al., "Issues in Modeling and Control on Intake Flow in Variable Geometry Turbocharged Engines", 18$^{th}$ IFIP Conf. System Modeling and Optimization, pp. 436-445, Jul. 1997.
Kulhavy, et al. "Emerging Technologies for Enterprise Optimization in Process Industries," Honeywell, 12 pages, Dec. 2000.
Locker, et al., "Diesel Particulate Filter Operational Characterization," Corning Incorporated, 10 pages, prior to filing date of present application.
Lu "Challenging Control Problems and Engineering Technologies in Enterprise Optimization," Honeywell Hi-Spec Solutions, 30 pages, Jun. 4-6, 2001.
Moore, "Living with Cooled-EGR Engines," Prevention Illustrated, 3 pages, Oct. 3, 2004.
National Renewable Energy Laboratory (NREL), "Diesel Emissions Control—Sulfur Effects Project (DECSE) Summary of Reports," U.S. Department of Energy, 19 pages, Feb. 2002.
Salvat, et al., "Passenger Car Serial Application of a Particulate Filter System on a Common Rail Direct Injection Engine," SAE Paper No. 2000-01-0473, 14 pages, Feb. 2000.
Shamma, et al. "Approximate Set-Valued Observers for Nonlinear Systems," IEEE Transactions on Automatic Control, vol. 42, No. 5, May 1997.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Storset, et al., "Air Charge Estimation for Turbocharged Diesel Engines," vol. 1 Proceedings of the American Control Conference, 8 pages, Jun. 28-30, 2000.
The Math Works, "Model-Based Calibration Toolbox 2.1 Calibrate complex powertrain systems," 4 pages, printed prior to filing date of present application.
The MathWorks, "Model-Based Calibration Toolbox 2.1.2," 2 pages, prior to filing date of present application.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.
Zenlenka, et al., "An Active Regeneration as a Key Element for Safe Particulate Trap Use," SAE Paper No. 2001-0103199, 13 pages, Feb. 2001.

* cited by examiner

//(2025)

EXHAUST GAS RECIRCULATION SYSTEM

BACKGROUND

The present invention relates to internal combustion engines, and particularly to exhaust gas recirculation (EGR) systems in engines. More particularly, the invention relates to more effective recirculation of exhaust gases.

SUMMARY

The invention is an approach for smoothing out (i.e., minimizing pulses) a flow of exhaust gas being recirculated in an engine.

DESCRIPTION

For emissions control in an internal combustion engine (e.g., a diesel engine) some of the exhaust gas from the engine may be redirected or recirculated back into the cylinders of the engine. The introduction of inerts (i.e., exhaust gas) into the cylinder may minimize or prevent NOx production which is a pollutant of concern. The present approach may be referred to exhaust gas recirculation (EGR). EGR systems may be open loop or depend on a coordination of actuators such as a vane position of a variable nozzle turbine (VNT), which may coordinate a flow of exhaust gas back into the engine. The present system may improve exhaust recirculation by adding a storage device to the RGR system.

Figure 1:
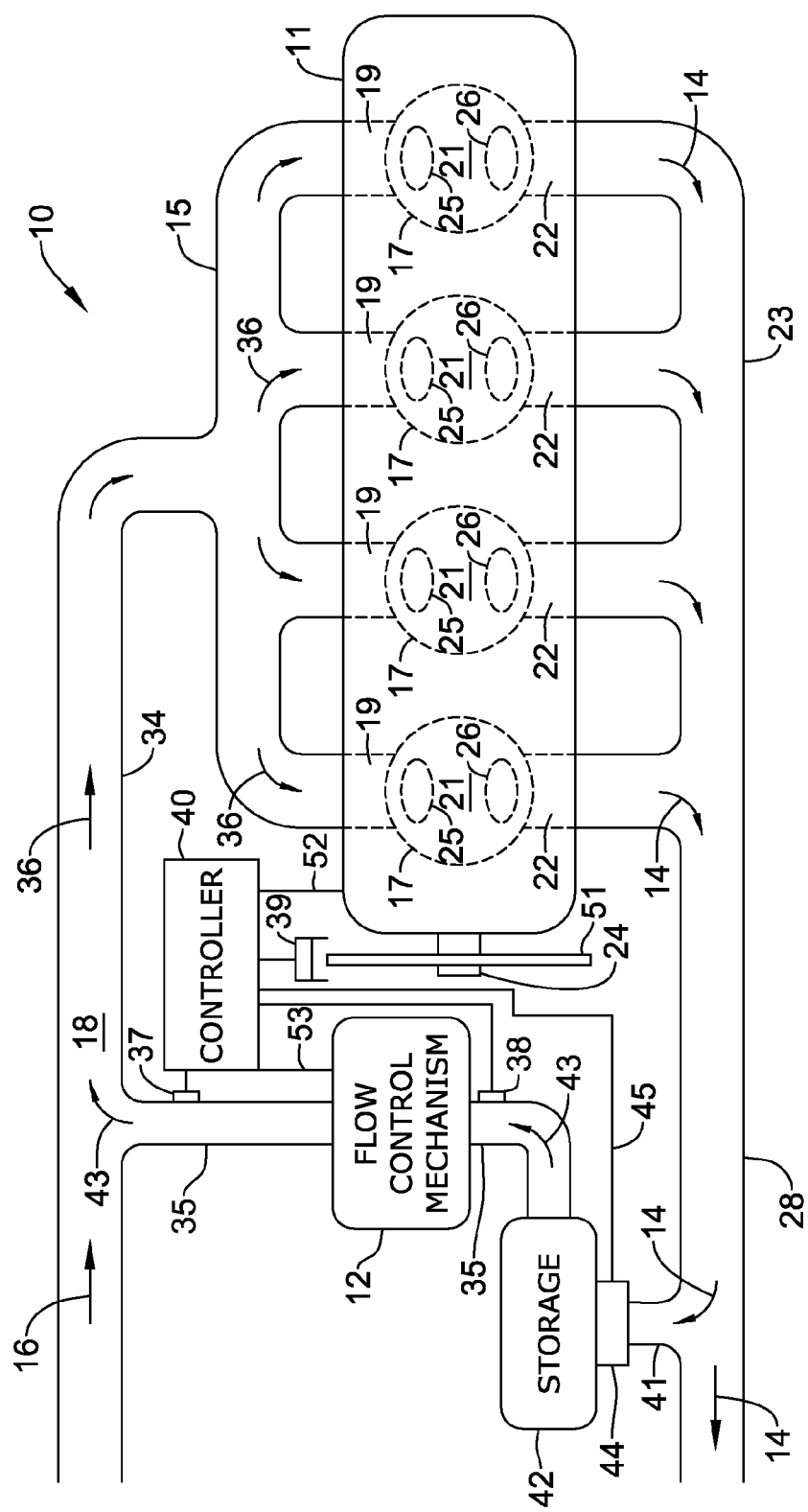
FIG. 1 is a diagram of an engine with an EGR system of having a storage mechanism.

FIG. 1 shows an illustrative instance of the present system. The Figure shows a system 10 having an engine 11 and an exhaust gas recirculation (EGR) mechanism having a flow control mechanism 12. Flow control mechanism 12 may be a valve, pump, or so on. Modern engines use exhaust gas recirculation (EGR) to lower the engine-out emissions of NOx emission to meet stringent emissions regulations. EGR is the recirculation of some of the engine 11 exhaust gases 14 back to the engine. The exhaust gas 14 may be combined with fresh air 16 into a mixture 36 before the intake manifold 15 at location 18 or within the intake manifold 15. Then the mixture 36 of fresh air 16 and exhaust gas 14 may enter cylinders 17 via the intake ports 19 at the proper times. A concern at this point is that the exhaust gas 14 from the engine may come in pulses. The present system may advantageously utilize the pulses and also provide a smooth flow of exhaust gas for recirculation to the manifold 15 and the cylinders 17, respectively. This may be accomplished with an addition of a storage device 42 that may store exhaust gas 14 coming from the engine. The flow of the exhaust gas during the pulses may be used to store some of the exhaust gas in the storage device 42. The exhaust gas 43 for recirculation at the inlet 34 of the intake manifold 15 may be supplied from the storage device 42 while at the same time the storage device 42 may be replenished with exhaust gas 14 from the exhaust manifold 23 via the inlet flow control mechanism 44 (which may be optional), pipe 41 and exhaust pipe 28. The interface 44 may possibly be controlled by line 45 connected to controller 40. Interface 44 may be able to control an entry of exhaust gas 14 or an exit of exhaust gas 43 according to pressure, pressure pulses and/or flow rate. The interface 44 may be a flow control valve that, at certain times, permits a one way flow of exhaust gas 14 into the storage device 42. Interface 44 may permit exhaust gas 14 to enter the storage device 42 during pressure pulses of the exhaust gas 14 or when the exhaust gas 14 exceeds a certain pressure. That means a certain pressure of the exhaust gas in the storage device 42 may be achieved. This improved pressure may assist an exhaust gas 43 at a pressure sufficient to go through the EGR valve 12 despite an overall higher pressure in the intake system area 18 than the exhaust system pipe 28 of the engine. The output exhaust gas 43 from the storage device 42 may be free of the pulses. On the other hand, the input/output port of device 42 may simply be open and act as a cushion to pressure pulses of the exhaust gas 14 that may enter the flow control mechanism 12. The device 42 of storage or capacitance may minimize or eliminate the necessity to deal with the exhaust gas pressure pulse and a dependent coordination of EGR valve action with the pulses. The present approach also may help with controlling cylinder-to-cylinder variation of exhaust gas 43 demand and providing different levels of EGR 43 to different cylinders 17 as required.

Figure 2:
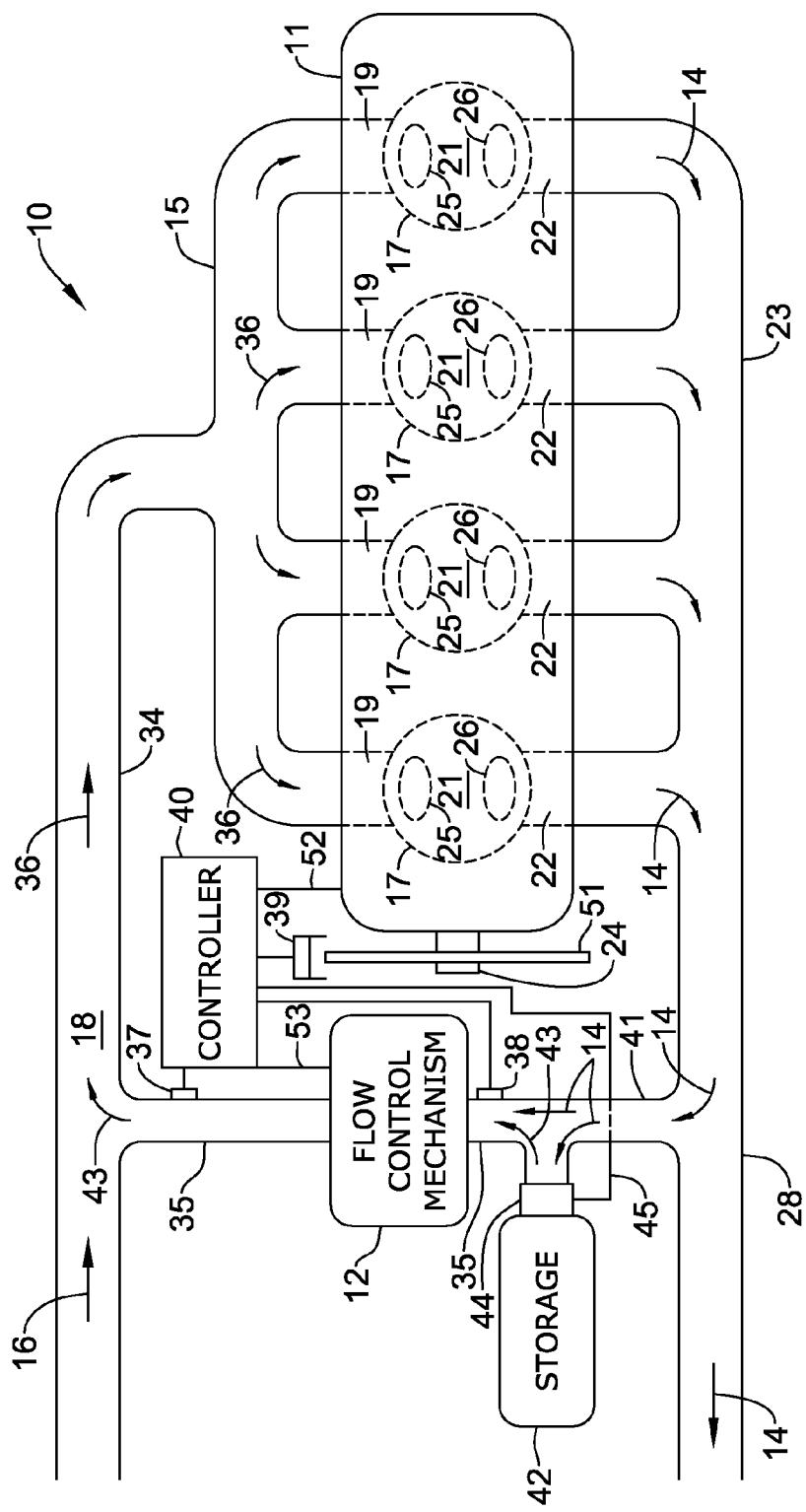
FIG. 2 is a diagram of another configuration of the EGR system in FIG. 1.

FIG. 2 reveals another configuration of the EGR system having the storage device 42. Some exhaust gas 14 having pressure pulses may enter storage device 42. Some exhaust gas 14 may go directly to the flow control mechanism 12. There also may be stored exhaust gas 43 from device 42 going to flow control mechanism 12. There may be an optional interface 44 controlled by line 45 connected to controller 40 and situated at the input/output of device 42. Interface 44 could control an entry of exhaust gas 14 or an exit of exhaust gas 43 according to pressure, pressure pulses and/or flow rate. The input/output port of device 42 may simply be open and act as a cushion to pressure pulses of the exhaust gas 14 that may enter the flow control mechanism 12.

The interface 44 may be a valve that, at certain times, permits a one way flow of exhaust gas 14 into the storage device 42. Interface 44 may permit exhaust gas 14 to enter the storage device 42 during pressure pulses of the exhaust gas 14 or when the exhaust gas 14 exceeds a certain pressure. That means a certain pressure of the exhaust gas in the storage device 42 may be achieved. This improved pressure may assist an exhaust gas 43 at a pressure sufficient to go through the EGR valve or flow control mechanism 12 despite the reduced pressure at moments of the incoming exhaust gas 43 and an overall higher pressure in the intake system area 18 than the exhaust system pipe 28 of the engine. The output exhaust gas 43 from the storage device 42 may be free of the pulses. The storage device 42 may smooth out the pressure variations of the overall exhaust gas 14 and 43 and still provide a higher overall pressure at the input of the flow control mechanism 12 relative to the exhaust gas 14 in the exhaust system pipe 28.

The following may provide a basis of the present system. A certain amount of fuel may be added to the mixture 36 (via a carburetor or fuel injectors) before entering or after going through the intake valve to the cylinder. This new mixture 36 may enter the respective cylinder during an intake cycle as permitted by an intake valve 25 to cylinder 17. Subsequently, the intake valve may close and a piston 21 in the cylinder compress the mixture 36 up against a head structure (head), not explicitly shown, that is attached to the top of the block containing the cylinder. The head may cap off and seal the cylinder 17 encompassing a volume between the piston and the head. As the piston moves towards its closest position to the head (i.e., top dead center—TDC) the volume of the mixture 36 may decrease and the pressure increase dramatically while the intake valve 25 and an exhaust valve 26 situated in the head are closed thereby maintaining the seal of the volume of the mixture 36. Also, manifolds 15 and 23 may be attached to the head having ports 19 and 22 connecting the manifolds to their respective valves 25 and 26. The valves 25 and 26 may be round but appear oval in the Figure because of their slanted orientation in the head relative to the top of piston 21. Alternatively, valves 25 and 26 may be situated in the top of the cylinder block of the engine along with the respective intake and exhaust manifolds being attached to the block. The intake valve 25 and exhaust valve 26 may be opened and closed by a camshaft (not shown) that is connected to a crankshaft 24. Other mechanisms may be utilized for bringing fuel mixtures to the engine and removing exhaust gases from the engine. At about the piston's closest point to the head, the compressed mixture 36 may ignite (due to the heat of a highly compressed mixture in a diesel engine or the spark of a plug in a gasoline engine) and expand thereby providing much pressure on the piston and pushing the piston away from the head. The piston 21 may be connected to the crankshaft 24 that is rotated by the force of the burning mixture 36 upon the piston, resulting in a power cycle. As the piston approaches its farthest position from the head (i.e., bottom dead center—BDC), the exhaust valve 26 may open and the piston 21 return back up the cylinder 17 and push a burnt mixture or exhaust gas 14 out of the cylinder 17 through the exhaust valve 26 into an exhaust manifold 23 via an exhaust port 22, resulting in an exhaust cycle. The exhaust valve 26 may close and the intake valve open thereby permitting the piston 21 to draw in another mixture 36 along with some fuel, into the cylinder 17 during its next intake cycle as the piston 21 moves down cylinder 17 away from the head. The sequence or intake, compression, power and exhaust cycles may repeat themselves for a given piston 21 and cylinder 17 over the next two rotations of the crankshaft 24. Each of the other pistons 21 and cylinders 17 may proceed through the same process. However, each piston may have its sequence of cycles offset from the other pistons somewhere from one-half to one-and-one-half revolutions of the crankshaft 24. Thus, in the case of the four cylinder engine 11 shown in FIG. 1, there may be one power cycle from one of the pistons 21 during each half revolution of the crankshaft 24. Engine 11 may instead have a different number of cylinders and configuration such as an in-line, "V" or opposed cylinder arrangement. The engine may be an internal combustion engine of another kind not having pistons. An example of such engine may be a Wankel engine.

The power of the engine 11 may be increased by compressing the mixture 36, along with the fuel, before it enters the cylinder 17, with a mechanism such as the turbocharger. The exhaust gases 14 exiting the engine 11 into manifold 23 may go to a turbine via an exhaust pipe 28. The exhaust gases 14 may turn or spin the turbine at a relatively high number of revolutions per minute (rpm). After the exhaust gases 14 pass the turbine, they may exit the turbo charger via the exhaust pipe. The turbine in turn may turn a compressor turbine via a shaft. The turbine may draw in fresh air 16 via an intake tube and output into a tube 34 that is connected to the manifold 15. Since the movement of air 16 into tube 34 is much faster than the normal intake of a naturally aspirated engine 11, the air 16 may become compressed as it enters the engine via the manifold 15. If the pressure of compressed air 16 is higher than the pressure of the exhaust gas 14 in pipe 28, then exhaust gas might not go through an open valve 12 and mix with air 16 in tube 34 or manifold 15 to result in an EGR. It is this differential pressure which may be of concern here.

EGR may be accomplished by means of a pipe 35, or other device for conveyance, which may connect the exhaust manifold 23 or exhaust pipe 28 to the intake manifold or air intake tube 34. In the EGR flow pipe 35, an on/off valve, a proportional flow valve or a reed valve may be situated in the pipe as the valve 12. When the on/off valve or the proportional flow valve is used, either one may be controlled at a conventional, slow time scale to modulate EGR as a function of load and speed of the crankshaft 24 of engine 11. In both these cases, the exhaust pressure should be greater than the intake pressure to provide an EGR flow in the right direction. The intake pressure and the exhaust pressure may be measured by pressure sensors 37 and 38, respectively. Sensors 37 and 38 may be connected to a controller 40. Signals from the sensors 37 and 38 may be utilized to determine the differential pressure across the flow control mechanism 12. This pressure may also be detected by a differential or delta pressure sensor appropriately situated. The speed or revolution rate or count of the crankshaft may be detected by a sensor 39 that is proximate to a flywheel 51 which is attached to crankshaft 24. Sensor 39 may be connected to controller 40. The valve or mechanism 12 may be connected to controller 40 via connection 53. Controller 40 may utilize mathematical models and appropriate control logic, look-up tables, or other schemes, in computing control signals from engine-related parameters for the flow control mechanism 12.

When the reed valve is used, the EGR flow may be dependent on the characteristics of such valve which are not actively controlled. In a well designed highly turbocharged engine 11, such as a diesel engine, the turbocharger may create an intake boost which is higher than the engine exhaust manifold pressure. Thus, in order to induce a flow of exhaust gas 14 from the exhaust manifold 23 or pipe 28 to the intake tube 34 or manifold 15, the time averaged exhaust manifold 23 pressure should be raised above the intake manifold 15 pressure. This may be a problem, because in essence, the intake pressure being higher than the exhaust pressure may negate the positive pumping contribution of the turbocharger and result in a loss of efficiency and fuel economy by the engine. Furthermore, since the exhaust pressure may be pulsing, due to individual cylinder events, pulses from the exhaust may be transmitted to the intake manifold 15. Some of the exhaust gas 14 flow accomplished during pressure pulses may be reversed when the exhaust manifold 23 pressure falls and the intake manifold 15 pressure is momentarily higher then the exhaust. To obtain a net result that is to accomplish the desired EGR rate, the engine may be "back-pressured" by, for example, obstructing the exhaust gas 14 flow in pipe 28, which may result in a fuel economy loss of the engine. Furthermore, as higher levels of EGR are required, the fuel economy penalty increases, and in some cases the engine will not be able to achieve the required EGR levels due to limitations in the turbocharger and engine 11 thermodynamics.

The present device or valve 12 may solve the problem of inducing flow of EGR without increasing back pressure. This may be accomplished by first recognizing that the exhaust gas 14 pressure has pulses, and that the magnitude of these pressure pulses are such that they exceed the intake mixture 36 pressure for certain periods of time. These pressure pulses may be detected by sensor 38. By closing the EGR path in tube or pipe 35 during unfavorable or negative pressure gradients, the present flow control mechanism or valve 12 may prevent reverse EGR flow; however, it then may re-open the path during positive or forward pressure with minimum flow restriction. The benefit is that the engine back-pressure requirement to induce the desired EGR flow may be lowered or eliminated. Thus, EGR may be able to flow "up-hill", i.e., in the appropriate direction from the exhaust manifold 23 or pipe 28 to the intake manifold 15 or tube 34 via tube 35, even where the time averaged intake manifold pressure is higher than the time averaged exhaust manifold pressure. The flow or flow rate of the fluid (e.g., gas 14) may be detected and measured with a flow sensor which may be connected to controller 40 via line 53. The flow sensor may be situated in tube 35 proximate to the flow control mechanism 12 or within the mechanism 12.

To accomplish this phenomenon, the present device or valve 12 may have a controllable open "window" area such that the flow area, time of opening and time of closing can be controlled to coincide with the favorable pressure pulses, thus opening only when forward flow will occur and only for a duration compatible with desired EGR flow rate. The valve may very rapidly control a flow of a fluid (i.e., a gas or liquid) with the opening and closing of the window with a moveable mechanical obstruction.

The valve 12 areas of opening and timing may be controlled on a cylinder by cylinder basis to accomplish a customized EGR flow for each exhaust pulse and to nominally equalize the EGR flow with respect to each pulse. Each cylinder may have an individual pressure sensor (not shown) connected to controller 40 via a connection line 52. This may be particularly useful if there is considerable cycle to cycle variation in the strength of the exhaust pulse which results in cycle to cycle and cylinder to cylinder variation in the exhaust gas recirculation rate. That could mean that if the cylinders are providing different amounts of power, recirculated gas may be provided in adjusted and different amounts in a timely fashion to each of the cylinders so as to result in the same amounts of power from each of the cylinders. This evenness of power from the cylinders may result in a very smooth running and efficient engine.

Since emissions from a given cylinder event may be particularly sensitive to an EGR rate, control of EGR rate as a function of exhaust pressure pulse strength may be particularly beneficial in terms of emissions, economy and power. This control strategy may be strengthened by the use of various other kinds of sensors which may be used to measure shock, vibration, pulses, temperatures, mixtures, and other parameters of the engine system. The signals from these sensors may be input to the processor or controller to provide appropriate signals to the flow control mechanism 12 for effective EGR. EGR flow control may be based on the use of pressure sensors and/or other related sensors together with mathematical models and appropriate control logic. Controller 40 may incorporate the mathematical models and the control logic for EGR flow control based on parameter signals from pressure sensors and/or the other related sensors as noted above.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. An exhaust gas recirculation system comprising:
   a flow control mechanism having an input port and an output port;
   a storage device connected to the input port of the flow control mechanism;
   a controller; and
   a flow control valve connected to the storage device, wherein the flow control valve is connected to the controller.

2. The system of claim 1, wherein the flow control valve is configured to permit some exhaust gas to enter the storage device and to permit some exhaust gas to flow directly from an exhaust system of the engine into the flow control mechanism.

3. The system of claim 1, further comprising:
   a first pressure sensor at the input port of the flow control mechanism; and
   a second pressure sensor at the output port of the flow control mechanism; and
   wherein the first and second pressure sensors are connected to the controller.

4. The system of claim 1, wherein the flow control valve permits a one way flow of exhaust gas into the storage device.

5. The system of claim 4, wherein the flow control valve permits exhaust gas to enter into the storage device during pressure pulses of the exhaust gas.

6. The system of claim 1, wherein:
   the output port of the flow control mechanism is for connection to an intake system of an engine; and
   the storage device has an input port is for connection to an exhaust system of the engine, and an output port for connection to the input port of the flow control mechanism.

7. The system of claim 6, wherein the controller is connected to the flow control mechanism.

8. A method for exhaust gas recirculation, comprising:
   directing a portion of exhaust gas pressure pulses from an engine to a chamber;
   controlling the directing of exhaust gas into the chamber with a controller connected to a flow control valve on the chamber;
   storing exhaust gas in the chamber; and
   providing a smooth flow of exhaust gas from the chamber to an intake system of the engine.

9. The method of claim 8, further comprising combining the exhaust gas with air in the intake system.

10. The method of claim 8, further comprising controlling the smooth flow of exhaust gas from the chamber to the intake system.

11. The method of claim 10, wherein the step of controlling the smooth flow of exhaust gas is achieved with a controller.

12. An exhaust recirculation system comprising:
    a flow control mechanism having an input and an output;
    a controller connected to the flow control mechanism; and
    a storage device having an output and input connected to the input of the flow control mechanism, the storage device having a flow control valve connected to its output and input, wherein the flow control valve is configured to permit some exhaust gas to enter the storage device and to permit some exhaust gas to bypass the storage device.

13. The system of claim 12, wherein:
    the input of the flow control mechanism is for connection to an exhaust system of an engine; and the output of the flow control mechanism is for connection to an intake system of the engine.

14. The system of claim 12, further comprising:
a first pressure sensor at the input of the flow control mechanism; and
a second pressure sensor at the output of the flow control mechanism; and
wherein the first and second pressure sensors are connected to the controller.

15. An on-demand EGR control apparatus having storage, comprising:
an exhaust gas recirculation valve having an output for connection to an intake of an engine;
a controller; and
a container having an input for connection to an exhaust of an engine and having an output connected to an input of the exhaust gas recirculation valve, the container having an interface mechanism at the input of the container, wherein the interface mechanism is connected to the controller.

16. The control apparatus of claim 15, wherein the container is for absorbing pressure pulses of an exhaust gas.

17. The control apparatus of claim 15, wherein the interface mechanism permits entry of an exhaust gas above a certain pressure into the container.

\* \* \* \* \*